United States Patent
Goldberg et al.

(10) Patent No.: US 8,352,365 B1
(45) Date of Patent: Jan. 8, 2013

(54) SYSTEM AND METHOD FOR ELECTRONIC BILL PRESENTMENT USING A THIRD PARTY

(75) Inventors: Robert M. Goldberg, Briarcliff Manor, NY (US); Julie A. Peck, Danbury, CT (US); Kenneth E. McDonald, Nesconset, NY (US); Richard A. Grossweiler, Bohemia, NY (US)

(73) Assignee: Pitney Bowes Inc., Stamford, CT (US)

( * ) Notice: Subject to any disclaimer, the term of this patent is extended or adjusted under 35 U.S.C. 154(b) by 1728 days.

(21) Appl. No.: 10/966,133

(22) Filed: Oct. 14, 2004

Related U.S. Application Data

(60) Provisional application No. 60/481,507, filed on Oct. 14, 2003.

(51) Int. Cl.
*G06Q 40/00* (2012.01)
(52) U.S. Cl. ............... 705/40; 705/34; 705/35; 705/1.1; 705/39
(58) Field of Classification Search .................... 705/40, 705/1.1, 34, 39, 41, 51, 35, 70, 4; 707/607, 707/100; 709/206
See application file for complete search history.

(56) References Cited

U.S. PATENT DOCUMENTS

| | | | | |
|---|---|---|---|---|
| 5,699,528 | A * | 12/1997 | Hogan | 705/40 |
| 6,408,284 | B1 * | 6/2002 | Hilt et al. | 705/40 |
| 2002/0077978 | A1 * | 6/2002 | O'Leary et al. | 705/40 |
| 2004/0210521 | A1 * | 10/2004 | Crea et al. | 705/40 |

OTHER PUBLICATIONS

Alexandria Andreeff: "Electronic bill presentment and payment—Is it just a click away?", Federal Reserve Bank of Chicago; Economic Perspectives; 2001.*

* cited by examiner

*Primary Examiner* — John H Holly
(74) *Attorney, Agent, or Firm* — George M. Macdonald; Charles R. Malandra, Jr.; Steven J. Shapiro

(57) ABSTRACT

A method and system for electronic bill presentment and payment using a third party intermediary is described. A third party provides an electronic post office that uses a virtual address directory to provide a level of abstraction in an EBPP data stream using the ACH network so that EBPP participants do not require the information that is typically required to process such transactions. By using the virtual address directory, neither the biller, nor the bank, nor the intermediary have all the consumer data used in the transaction. Accordingly, privacy is enhanced and any risk that privacy will be compromised is reduced.

18 Claims, 6 Drawing Sheets

SYSTEM AND METHOD FOR ELECTRONIC BILL PRESENTMENT USING A THIRD PARTY

CROSS REFERENCE TO RELATED APPLICATIONS

This application claims priority under 35 U.S.C. section 119(e) from Provisional Patent Application Ser. No. 60/481,507, filed Oct. 14, 2003, entitled SYSTEM AND METHOD FOR ELECTRONIC BILL PRESENTMENT USING A THIRD PARTY, which is incorporated herein by reference in its entirety.

BACKGROUND

The illustrative embodiments described in the present application are useful in systems including those for electronic bill presentment and payment (EBPP) and more particularly are useful in systems including those for electronic bill presentment using a third party.

Electronic Bill Presentment and Payment systems have several forms. For example, in a direct bill model, a vendor such as a credit card company maintains an internet based system for processing EBPP transactions for customers of the particular credit card company. Such bill direct EBPP systems are popular with credit card customers, but the adoption rate for systems provided by other types of vendors such as utilities is low.

Additionally, systems based upon a consolidator model exist. For example, EBPP consolidators such as the MYCHECKFREE.COM® EBPP portal allow customers to enroll for e-bills from one or more vendors that participate in the particular consolidator program. In such a system, the customer may access bills from multiple vendors and make payments using one portal. The consolidator may then arrange for consolidated payments to the vendors that incorporate payments from multiple users.

Home banking online systems have become popular with adoption rates of approximately 50%. Certain home banking systems allow for online bill payments. In a typical home banking system having an electronic payment option, a consolidator processes the payments. If a particular vendor is not enrolled with the consolidator, a paper check is cut and mailed to the vendor. In such systems, the bill may not be electronically presented to the user, but the user may enter a payment for processing.

The National Automated Clearing House Association (NACHA) is an industry organization that is said to develop operating rules and business practices for the Automated Clearing House (ACH) Network and for electronic payments in areas including Internet commerce and electronic bill and invoice presentment and payment (EBPP, EIPP).

NACHA describes an Electronic Bill Information Delivery Service (EBIDS). The EBIDS system uses the ACH network as a bill information delivery and payment solution. In the EBIDS system, a biller creates a summary electronic bill as a zero-dollar ACH transaction and the biller's financial institution originates the ACH billing file into the ACH network. The consumer's financial institution receives the summary bill file and makes the summary billing information available to the consumer. The consumer views the summary bill and instructs the financial institution to make payment. The consumer's financial institution creates an ACH credit and routes the payment along with the remittance data through the ACH network and the payment is processed.

SUMMARY

The present application describes systems and methods for electronic bill payment and presentment using a third party. In one embodiment, a third party provides an electronic post office that uses a virtual address directory to provide a level of abstraction in an EBPP data stream using the ACH network so that EBPP participants do not require the information that is typically required to process such transactions. By using the virtual address directory, neither the biller, nor the bank, nor the intermediary have all the consumer data used in the transaction. Accordingly, privacy is enhanced and any risk that privacy will be compromised is reduced.

DETAILED DESCRIPTION OF EMBODIMENTS

Figure 1:
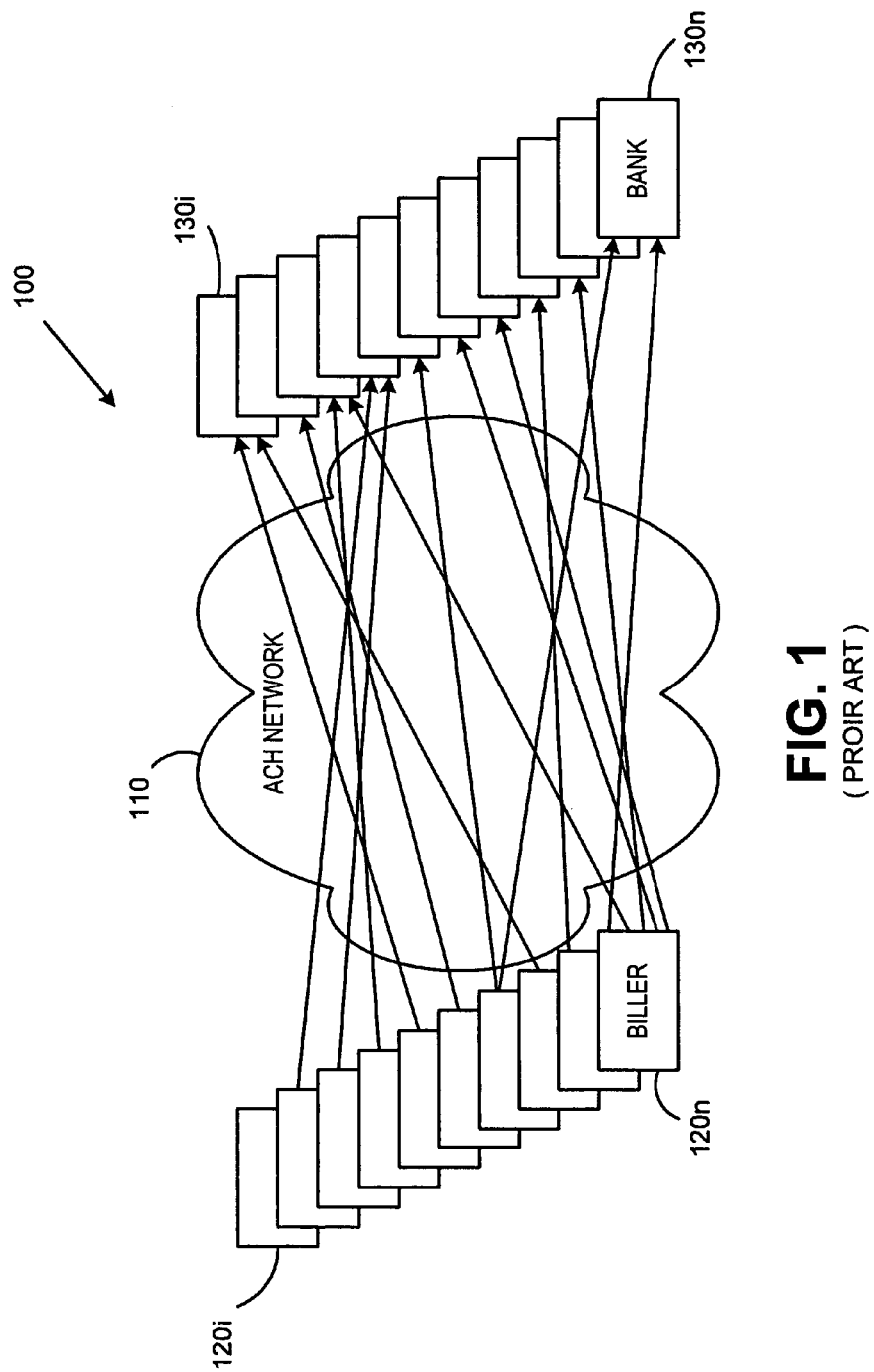
FIG. 1 is a schematic representation of a prior art EBPP system.

Several EBPP systems currently exist and at least one system uses the ACH network. Referring to FIG. 1, a prior art EBPP system 100 is described. An ACH network 110 connects billers 120$i$-120$n$ to banks 130$i$-130$n$. The NACHA EBIDS system may process EBPP transactions using one bank and one biller. In such a system, both parties have access to the ACH network in the normal course of business as it is today. Accordingly, the system requires that a direct ACH link would exist between billers and banks as is the case in a 1-bank to 1-biller implementation.

Essentially, bill "summary" data would be delivered to the consumers' banks as an addendum to a $0 ACH transaction. The consumer could then pay the bill within their online banking environment. If the consumer wanted to see any detail on the bill, they'd have to go directly to their paper bill or to the biller's web site, as the summary data delivered by NACHA will be limited and may include information such as an amount due and a due date. However, in such a system, each biller would have to send bill summaries to the banks of each individual customer, creating an inefficient network that requires each biller and bank to form independent ACH relationships with one another.

Figure 2:
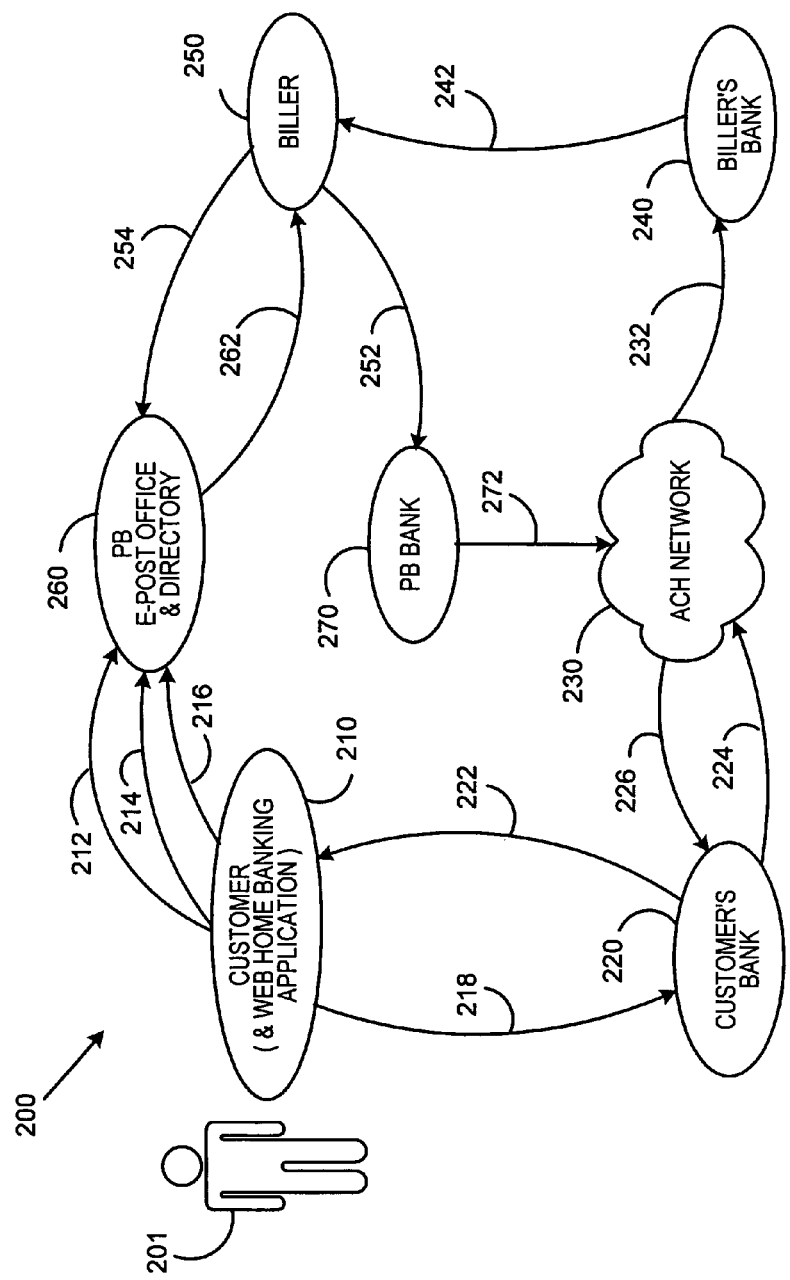
FIG. 2 is a schematic diagram of an EBPP system according to an illustrative embodiment of the present application.
Figure 3:
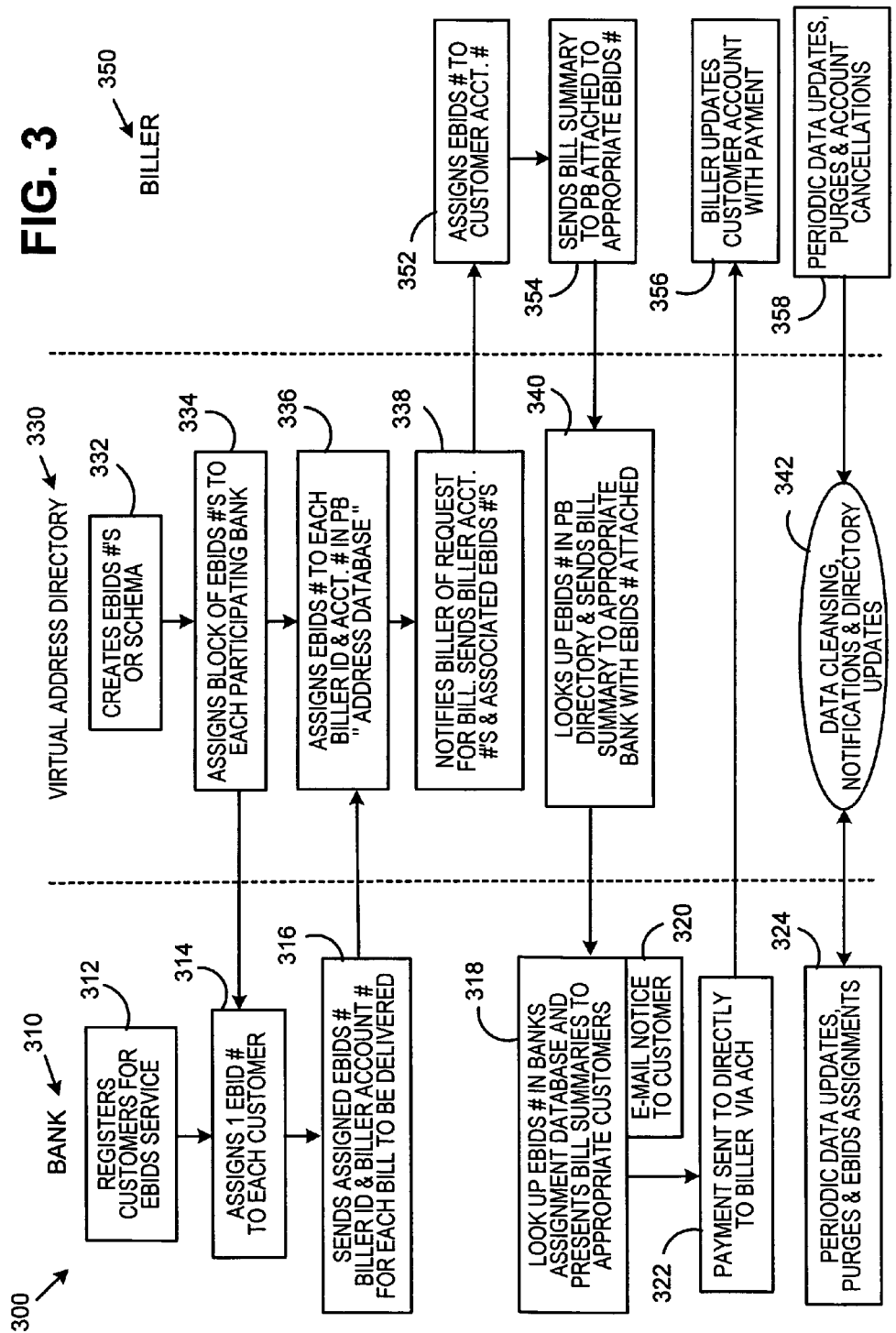
FIG. 3 is a schematic representation of the process flow for an EBPP system according to the illustrative embodiment shown in FIG. 2.

Referring to FIGS. 2 and 3, an illustrative embodiment of an EBPP system according to the present application is described. A third party (or a biller or vendor acting as an intermediary) provides a third party system such as a hub system including an electronic post office and account maintenance hub for an EBPP system such as an EBPP system that operates using the ACH network.

In one embodiment, consumers register with the third party hub system and identify their banking information. For example, the user may select a particular bank from a pull down menu and then enter an account number. Other input methods may include verifying data that was presented to the user or scanning information such as that on a check. For example, the user may input data regarding where the bill should be delivered or their virtual address. The third party hub system stores such information in a database.

The billers register with the third party system so that banks and consumers will know which billers are available through the system. The hub can communicate with the biller and bank and inform the billers of the bill destination. The third party system acts as a clearinghouse for the information (or virtual addressing) needed to deliver the bills to the proper banks and accounts. When a consumer switches banks, their bills remain portable.

Another system or vendor may be used as the clearinghouse for the bill (and optionally the payment). Billers may include credit card companies, banks, utilities, retailers, finance companies insurance companies and other entities that bill consumers. A Virtual Address Directory (VAD) is provided. The VAD allows billers and banks to register for the EBIDS system one time. The one time registration then allows the billers and banks to send bill summaries (and/or payments) to all participants.

Through the use of an anonymous identifier (an EBIDS ID #), the VAD eliminates the need for billers and banks to share confidential customer information with each other or even with the VAD. By using the VAD, neither the biller, nor the bank, nor the VAD have all the consumer data used in the transaction. Accordingly, privacy is enhanced and any risk that privacy will be compromised is reduced.

Billers and banks can both update the VAD when customers change bank accounts or switch payment methods. The VAD ensures that the most updated addressing information is being used to deliver an EBIDS transmission. New banks and billers can join the EBIDS system at any time by registering with the VAD. In a system that does not use such a central directory, lagging banks or billers will have a difficult time making the one-to-one connections between delivery partners.

The illustrative embodiments described herein enable the participation of smaller banks that might not have the internal resources required to create connections to individual billers. The VAD acts as the delivery agent for EBIDS bill summary files and ensures that the correct bill arrives at the correct bank. It ensures that the bill arrives at the correct customer's online banking application.

Referring to FIG. 2, an EBPP system 200 according to an illustrative embodiment of the present application is shown. A representative customer 201 utilizes a data processing system such as a personal computer 210 that is running a web home banking application. The customer 201 communicates with a third party hub system such as the PB e-Post Office & Directory server 260. The communications channels are wired, but may also comprise wireless connections. The communications channels utilize appropriate security measures, but in certain systems such as physically secure areas, they communications channel may not be electronically secured. In system data interaction 212, the customer 201 provides registration data to the hub 260. In system data interaction 214, the customer 201 identifies bank account information for routing bills. For example, the customer may select a particular bank from a pull down menu and then enter an account number. Other input methods may include verifying data that was presented to the user or scanning information such as that on a check. For example, the user may input data regarding where the bill should be delivered or their virtual address. The third party hub system 260 stores such information in a database.

The billers 250 register with the third party hub system 260 so that banks and consumers will know which billers are available through the system. The hub can communicate with the biller and bank and inform the billers of the bill destination. The third party system acts as a clearinghouse for the information (or virtual addressing) needed to deliver the bills to the proper banks and accounts. When a consumer switches banks, their bills remain portable.

The hub 260 uses system data interaction 262 to poll Customer Data. The system uses system data interaction 254 to provide data for Valid Customers and their bank account routing data. Another system or vendor may be used as the clearinghouse for the bill (and optionally the payment). Billers may include credit card companies, banks, utilities, retailers, finance companies insurance companies and other entities that bill consumers. A Virtual Address Directory (VAD) is provided on the hub 260. The VAD allows billers and banks to register for the EBIDS system one time. The one time registration then allows the billers and banks to send bill summaries (and/or payments) to all participants.

Through the use of an anonymous identifier (an EBIDS ID #), the VAD eliminates the need for billers and banks to share confidential customer information with each other or even with the VAD. By using the VAD, neither the biller, nor the bank, nor the VAD have all the consumer data used in the transaction. Accordingly, privacy is enhanced and any risk that privacy will be compromised is reduced. Billers and banks can both update the VAD when customers change bank accounts or switch payment methods. The VAD ensures that the most updated addressing information is being used to deliver an EBIDS transmission. New banks and billers can join the EBIDS system at any time by registering with the VAD. In a system that does not use such a central directory, lagging banks or billers will have a difficult time making the one-to-one connections between delivery partners. The illustrative embodiments described herein enable the participation of smaller banks that might not have the internal resources required to create connections to individual billers. The VAD acts as the delivery agent for EBIDS bill summary files and ensures that the correct bill arrives at the correct bank. It ensures that the bill arrives at the correct customer's online banking application.

The biller 250 communicates with the PB Bank 270 that can inject bill presentment information into the ACH network 230. The Biller 250 uses system data interaction 252 to provide bill data to the PB Bank system 270. The PB Bank system 270 uses system data interaction 272 to inject Bill Presentment information using the ODFI system into the ACH network 230. The system data interaction 226 is used to send Bill Presentment information by the RDFI system to the Customer's bank 220. The Customer's Bank 220 uses data interaction 222 to provide Bill Presentment data to the Customer 210. The customer 201 then uses PC 210 to make an ACH payment using data interaction 218 to the Customer's Bank 220. The Customer's Bank 220 then uses data interaction 224 to provide Bill Payment information received by the ODFI system. The ACH Network 230 uses data interaction 232 to send Bill Payment information received by the RDFI system to the Biller's Bank 240. The Biller's Bank 240 then uses data interaction 242 to provide Payment Acknowledgement information to the Biller 250 and the process has completed.

Referring to FIG. 3, a process 300 for use with EBPP system 200 according to an illustrative embodiment of the present application is shown. A representative bank 310 interacts with a Virtual Address Directory (VAD) 330 that acts as an intermediary with a Biller 350. The flowchart depicts three independent systems running processes that interact as shown at various times. In step 332, the VAD 330 creates EBIDS numbers or Schema. In step 334 the VAD assigns a block of EBIDS numbers to each participating bank. Meanwhile, the representative bank 310 in step 312 registers customers for the EBIDS service. Since the bank 310 has been assigned a group of numbers, in step 314 it assigns one EBID number to each customer. In step 316, the bank 310 sends assigned EBIDS number, Biller ID and Biller Account number for each bill to be delivered.

In step 336, the VAD 330 now can assign an EBIDS number to each biller ID and account number in the PB Address Database. In step 338, the VAD 330 then notifies the Biller 350 of the Request for the Bill, Sends the Biller account numbers and associated EBIDS numbers to the Biller 350. In step 352, the Biller 350 receives that notification and data and assigns the EBIDS number to the customer account number. In step 354, the Biller 350 sends a bill summary to the Intermediary PB VAD 330 attached to the appropriate abstracted EBIDS number.

In step 340, the intermediary VAD 330 looks up the EBIDS number in the PB directory and sends the bill summary to the appropriate associated bank 310 with the EIBDS number attached. In step 318, the bank 310 looks up the EBIDS number in the bank assignment database and presents bill summaries to appropriate customers. In step 320, the bank 310 sends an email notice to the appropriate customer. In step 322, the bank 310 receives payment instructions from its customer and sends payment directly to the Biller 350 via the ACH network. In step 356, the Biller updates the customer account with the payment-received data. Of course, the ACH payment may be processed by the Biller's bank as an intermediary.

In steps 324, 342 and 358, maintenance and updating functions are described. In step 324, the bank 310 periodically updates data and purges EBIDS assignments. In step 342, the VAD intermediary 330 performs data cleansing, notifications and directory updates. In step 358, the Biller 350 performs periodic data updates, purges and account cancellations.

Figure 4:
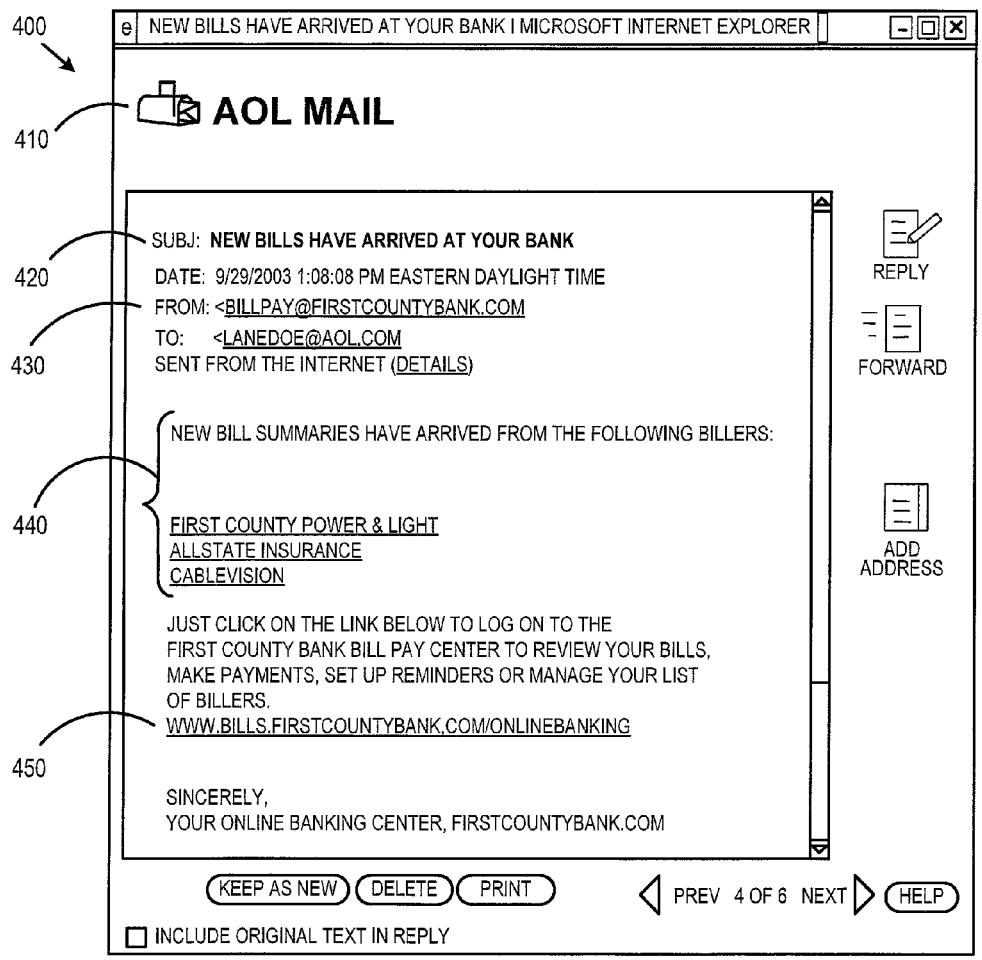
FIGS. 4-6 are illustrative screen displays of an EBPP system according to the illustrative embodiment shown in FIG. 2.
Figure 5:
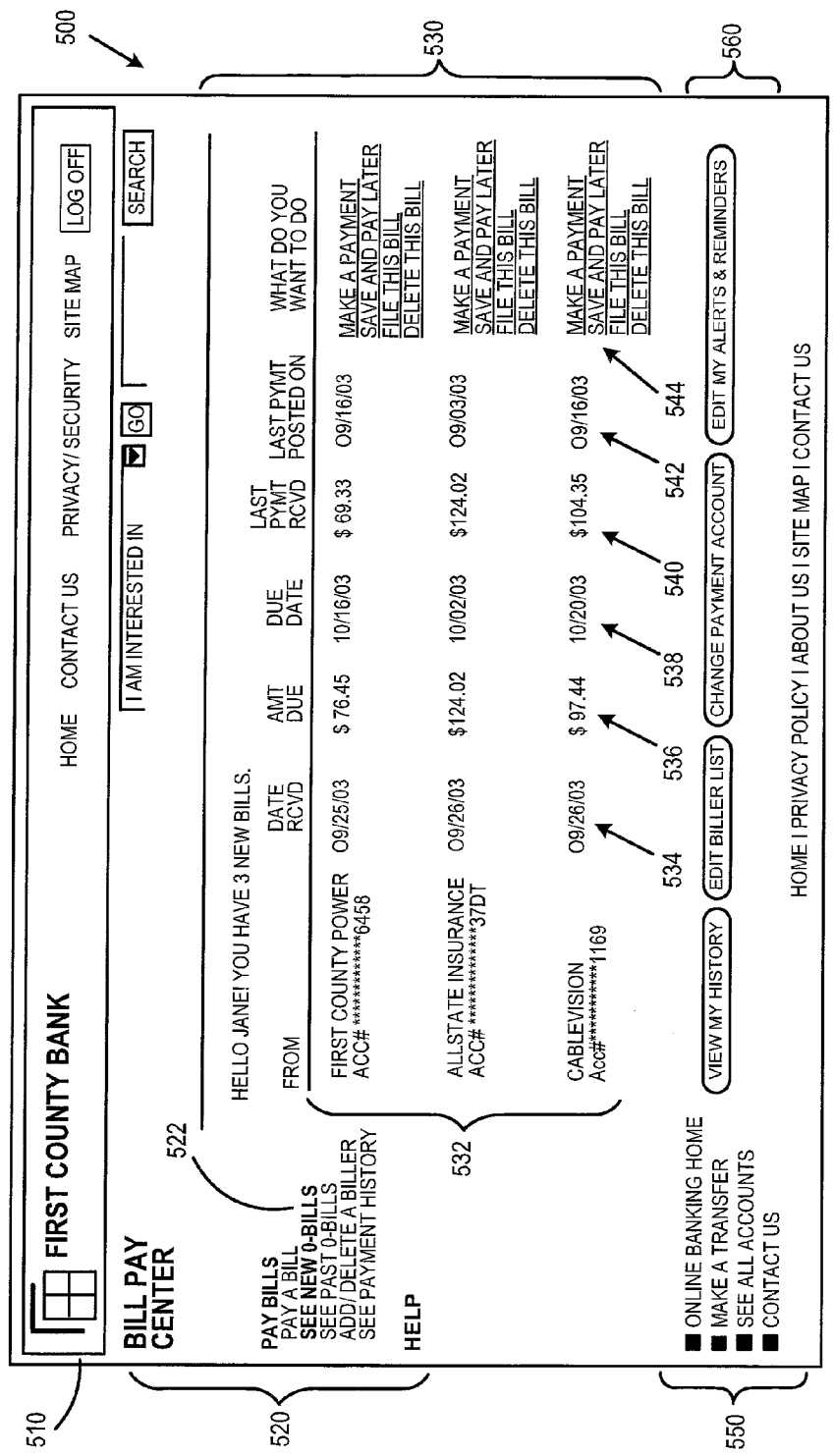
Figure 6:
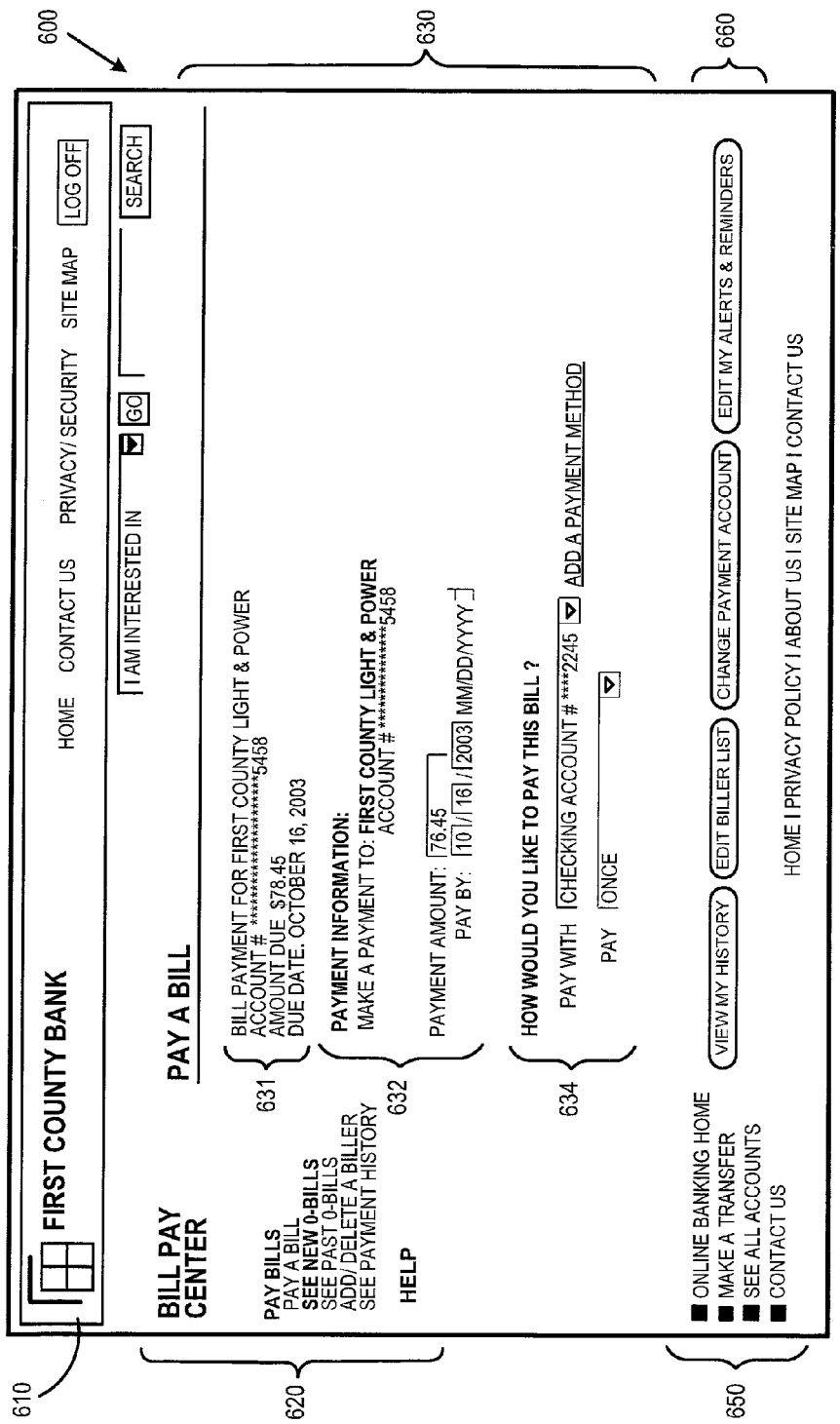

Referring to FIGS. 4-6, representative screen shots are shown for use with an EBPP system according to an illustrative embodiment of the present application. Referring to FIG. 4, the bank sends an email 400 to the customer when a bill summary data arrives from a biller. The email 400 could be received in any email client such as the AOL MAIL client 410. The subject line 420 identifies the email as providing e-Bill information. In line 430, the sender is identified. In section 440, a list of the new e-Bills is provided and in section 450, a link for the customer is provided to enable the customer to log into the e-Billing system.

Referring to FIG. 5, the customer logs on to their online banking application and is presented with summary data. Detailed data can be viewed independently or in paper form. As shown, the web site 500 is identified as having the bank as the source of the site in heading 510. In selection area 520, the customer may select a function to perform. When the pay a bill choice is selected, interactive frame 530 is utilized to display the current bills available to pay. The frame portion 530 corresponds to a selection 522 of See New e-Bills in selection area 520. Frame 530 includes a list of three new bills 532. For each bill, there is a date received value 534, an amount due value 536 and a due date value 538. For each bill, there is also data regarding the last payment received in the amount 540 and date 542 fields. The frame 530 also includes a new selection area 544 for further action. Additionally, the customer is provided with top level menu options 550 and account maintenance options 560 that allow the customer to view a transaction history, edit a biller list, change payment account information and to edit a list of alerts and reminders.

Referring to FIG. 6, the customer may pay the bill using the bank's existing bill pay engine using interactive site 600. As shown, the web site 600 is identified as having the bank as the source of the site in heading 610. In selection area 620, the customer may select a function to perform. When the pay a bill choice is selected, interactive frame 630 is utilized to process the pay the bill function. Frame portion 631 provides details to the customer regarding the bill. As can be appreciated, the bill is a utility bill. In frame portion 632, the customer is prompted for payment information including the amount to pay and the date to pay. In frame portion 634, the customer selects a financial account for use in paying the bill. The customer may be presented with a list of predetermined account to use. Additionally, the customer is provided with top level menu options 650 and account maintenance options 660 that allow the customer to view a transaction history, edit a biller list, change payment account information and to edit a list of alerts and reminders.

In another embodiment, the following process is used. A User enters the Third Party system (Electronic Post Office) using a posted Web address or from their Home Banking Application. The User Registers with registration data that is verified by an external third party. The external third party verifier could be the Home Banking application, credit agency or other third party. The User selects the Bank that is to receive Billing Data and enters their Routing and Account info. The User also selects the participating Biller.

A File is made available to the selected Biller with a request to have bill data sent through the ACH system. The Biller validates the requested user identity and processes the user requests. The Biller sends the file to their ODFI. The Billing data Routing codes direct the data to the Third Party bank as RDFI. The Third Party Bank sends data, as ODFI, to the defined bank or RDFI. The RDFI reports NOC's back through the Third Party System ODFI and the electronic post office is updated with new banking data.

The participating presenting banks modify their home banking application to display ACH delivered summary bills. They provide, if necessary, registration authentication data to the third party system. They also Deliver NOC data to ODFI based on summary data rather then payment data. The participating billers process user data received from the third party system and format billing data into an ACH file format. The billers also deliver the file to ODFI. The Third Party system acting as an Electronic Post Office registers and authenticates users through a third party source. The Third Party system stores user data, register Billers and provides a download site for user data to biller's AR. The Third Party system ODFI handles all housekeeping between the end presentation Bank and the User including NOC's. Finally, the Third Party system provides customer service to the biller, banker and user.

The present application describes illustrative embodiments of a system and method for electronic bill presentment and payment. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

What is claimed is:

1. A computer implemented method for electronic bill presentment and payment comprising:
    sending a biller identifier and an associated anonymous virtual address identifier associated with a customer to a biller;
    receiving, using a computer, summary bill data for a bill associated with the customer from the biller with the anonymous virtual address identifier associated with the customer;
    storing said summary bill data in a memory store of the computer;
    using the anonymous virtual address identifier to determine ACH routing information for a bank that is currently associated with the anonymous virtual address identifier;
    obtaining the summary bill data from the memory store and routing, using the computer, the summary bill data and the anonymous virtual address identifier along an ACH network to the bank using the determined ACH routing information.

2. The method of claim 1 further comprising:
    then receiving incoming payment data associated with the summary bill data from the bank using the ACH network.

3. The method of claim 2 further comprising:
    then sending outgoing payment data using the ACH network.

4. The method of claim 3 wherein:
    the outgoing payment data is sent to the biller associated with the bill data.

5. The method of claim 3 further comprising:
    the outgoing payment data is sent to a biller bank associated with the bill data.

6. The method of claim 1 wherein the summary bill data consists of an indication of an amount due and an indication of a due date.

7. A computer implemented method for electronic bill presentment and payment comprising:
    receiving at a computer an anonymous virtual address identifier and a customer identifier from a billing intermediary;
    associating, using the computer and the customer identifier, the anonymous virtual address identifier with a customer;
    determining if a bill associated with the customer is available to send; and
    sending summary bill data for the available bill associated with the customer with the anonymous virtual address identifier from the computer to the billing intermediary along an ACH network.

8. The method of claim 7 further comprising:
    then receiving bill payment data associated with a payment and the virtual address identifier.

9. The method of claim 8 further comprising:
    associating the bill payment data with the customer using the virtual address identifier.

10. The method of claim 9 further comprising:
    receiving bill payment data from a biller bank along the ACH network.

11. The method of claim 10 wherein:
    the bill payment data comprises a payment acknowledgement message.

12. The method of claim 7 wherein the summary bill data consists of an indication of an amount due and an indication of a due date.

13. A system for electronic bill presentment and payment comprising:
    an intermediary bill payment processing server including,
    a virtual address directory database for storing a plurality of virtual address numbers and associated records,
    a virtual address number generator for generating each of the plurality of virtual address numbers, wherein each virtual address number is assigned to a respective one of a plurality of customers, each of the plurality of customers associated with a respective bank and a respective biller;
    a virtual address number data processing subsystem including,
        an incoming bill data association subsystem for associating incoming summary bill data with the respective customer using the respective virtual address number, and
        a customer association subsystem for associating the customer with the respective bank using the respective virtual address number; and
    a data directory update subsystem that changes association of the respective virtual address identifier from the respective bank to another bank.

14. The system of claim 13 further comprising:
    an outgoing bill data subsystem for obtaining routing data for the respective bank and;
    sending summary bill data and the respective virtual address number to the bank.

15. The system of claim 14, wherein the outgoing bill data subsystem interfaces with an electronic funds transfer network.

16. The system of claim 15, wherein the electronic funds transfer network comprises an ACH network.

17. The system of claim 16, wherein the outgoing bill data subsystem sends the summary bill data and the respective virtual address number along the ACH network.

18. The system of claim 13 wherein the summary bill data consists of an indication of an amount due and an indication of a due date.

* * * * *